Feb. 10, 1959     J. M. LOWERY     2,873,424
TUBE TESTER
Filed July 1, 1954
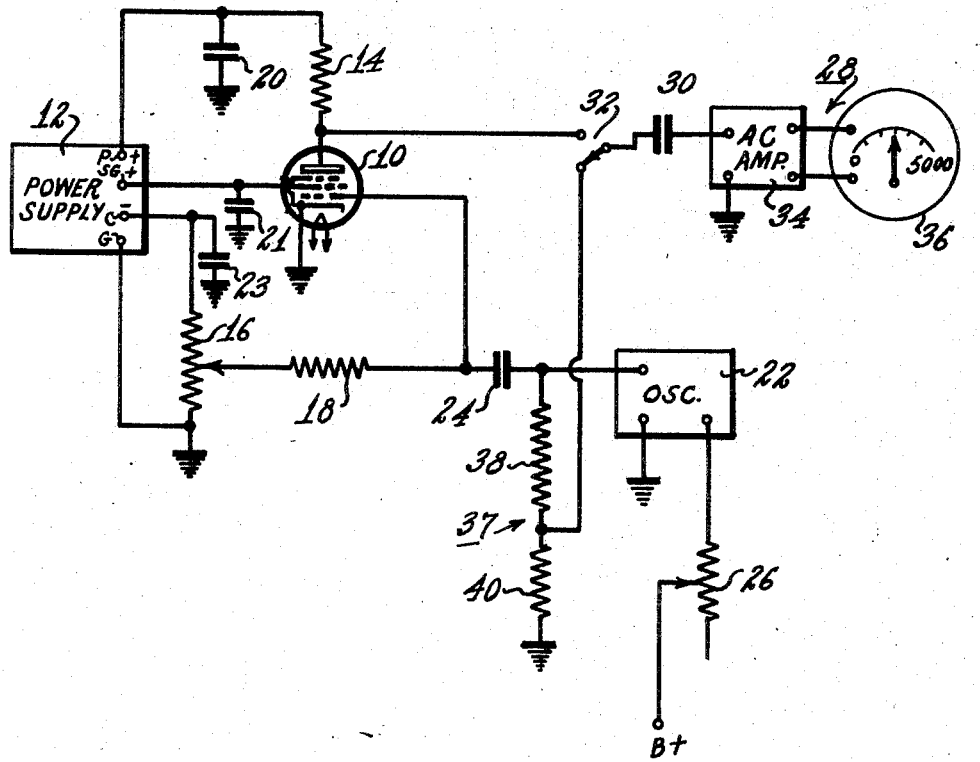
INVENTOR.
JOHN M. LOWERY
BY
ATTORNEY 2,873,424

Patented Feb. 10, 1959

2,873,424

TUBE TESTER

John M. Lowery, Barrington, N. J., assignor to Radio Corporation of America, a corporation of Delaware Application July 1, 1954, Serial No. 440,619

10 Claims. (Cl. 324—26)

This invention relates generally to tube testers, and more particularly to an improved tube tester of the type used to measure the mutual conductance of the vacuum tubes. While neither specifically nor exclusively limited thereto, the improved tube tester of the present invention is particularly useful in measuring the mutual conductance of tubes and providing an indication directly on the face of an indicating instrument, in terms of micromhos.

In many of the prior art tube testers, circuits are used which indicate whether the tube under test is good, weak or bad. The reading on the indicating instrument of the tube tester is generally an arbitrary designation which may, or may not, be directly related to the actual mutual conductance of the tube being tested. Tube testers of this type are usually not satisfactory for testing the actual mutual conductance, in terms of micromhos, of a tube so that its operation may be checked with the data given for these tubes in tube manuals.

When it is desired to determine the true mutual conductance of a vacuum tube under normal operating conditions, as indicated in a tube manual, for example, testers employing an electrodynamometer and/or sensitive bridge circuits are used. These tube testers are generally relatively expensive and require extensive manual manipulation by skilled personnel.

It is, therefore, a principal object of the present invention to provide an improved tube tester adapted to overcome the aforementioned disadvantages and to indicate the mutual conductance of a tube under test directly in absolute units of micromhos.

Another object of the present invention is to provide an improved tube tester that will indicate the mutual conductance of a tube under test accurately, regardless of any inherent changes in the sensitivity of the circuits of the apparatus.

A further object of the present invention is to provide an improved tube tester adapted to test a tube under normal operating conditions whereby the value of its transconductance is indicated directly on the face of an indicating instrument, in micromhos, so that it may be compared with the value of the mutual conductance given in tube manuals.

Still a further object of the present invention is to provide an improved tube tester of the type described that is simple to operate, economical to manufacture and yet comparable in efficiency to some of the more expensive and bulkier testers of the prior art.

These and further objects of the present invention are attained in an improved tube tester adapted to indicate, in terms of micromhos, the mutual conductance of a tube when operating under normal operating conditions, such as stipulated in a tube manual. The tube to be tested has applied to it a source of operating potentials so that conduction is produced therethrough. A relatively high frequency sine wave signal is applied to a control electrode of the tube as, for example, the grid of a triode. The same high frequency signal is also applied across a voltage divider and the A.-C. current flowing through this voltage divider is measured on a Ballantine type meter. A portion of the voltage divider is used as a shunt for the meter. Since the values of the impedances comprising the voltage divider and shunt are known, and since the amplitude of the high frequency signal can be adjusted, the conductance of the portion of the voltage divider in series with the Ballantine type meter may be calibrated, on the meter, directly in micromhos. The grid-anode path of the tube under test, an anode load resistor and a capacitor comprise a circuit connected in parallel with the voltage divider. Switching means are provided to connect the Ballantine type meter in series with the grid-anode path of the tube under test so that its conductance may be compared to the known conductance of the portion of the voltage divider used to calibrate the Ballantine meter. Since the source of all operating potentials is capacitively by-passed and the frequency of the test signal is about a thousand times the power line frequency, the internal effective impedance of the source is reduced to substantially zero. Also, the use of a high frequency test signal permits the filtering components and by-pass capacitors to be relatively small and, therefore, relatively less expensive.

The novel features of the invention, as well as the invention itself, both as to its organization and method of operation will be understood in greater detail from the following description when considered in connection with the accompanying drawing which is a schematic diagram, partly in block diagram form, of a tube tester, in accordance with the present invention.

Referring now to the drawing, there is shown the circuitry for a tube tester for testing a vacuum tube 10. The tube 10 may be substantially any of the vacuum tubes having at least three electrodes, such as the type commonly used in radio receivers. The tube 10 illustrated is of the pentode type wherein the suppressor grid is connected internally to the cathode. The anode of the tube 10 is connected to a plate voltage terminal P of a source of operating potential or power supply 12, through a load resistor 14. The cathode of the tube 10 is connected to a source of reference potential, such as ground. The tube 10 may be of the heater type wherein the heater element is connected to a source of operating potential (not shown), as is well known in the art. The screen grid of the tube 10 is connected to the screen grid terminal SG of the power supply 12. A potentiometer 16 is connected between the grounded terminal G and the C-terminal of the power supply 12, for grid bias purposes. The movable tap of the potentiometer 16 is connected to the control grid of the tube 10 through a resistor 18, for the purpose of providing the tube 10 with a desired grid bias. A capacitor 20, of relatively high capacitance, is connected across the power supply 12 for the purpose hereinafter appearing. The screen grid voltage and the C-voltage are also by-passed to ground by capacitors 21 and 23, respectively.

Means are provided to apply a relatively high frequency test signal, in the order of 80 kc., to the grid of the tube 10 under test. To this end, an oscillator 22 has an output terminal connected to the grid of the tube 10 through a coupling capacitor 24. The oscillator 22 may be of a conventional type, such as the Hartley type. The oscillator 22 is grounded. The amplitude of the oscillations of the test signals produced by the oscillator 22 may be varied by means of a variable resistor 26 connected in series between a source of B+ voltage (not shown) and the oscillator 22. Thus, it will be understood that with normal operating voltages supplied to the tube 10, as for example the voltages prescribed for the tube in a manufacturer's tube manual, and with a high frequency test signal applied to the control grid thereof, an A.-C. current output may be derived at the anode of the tube 10. The current output at the anode of the tube 10 may be determined by connecting a Ballantine type meter 28 to the anode of the tube 10 through a coupling capacitor 30 and one position of a multiposition switch 32.

The Ballantine type meter 28 comprises an A.-C. amplifier 34 whose output is connected across an indicating meter 36.

The Ballantine type meter 28 has a "high pass" characteristic; that is, this meter 28 will indicate accurately at frequencies of about 20 kc. above and below the test signal frequency. The meter 28 attenuates to a high degree all frequencies 20 kc. lower than the signal frequency, and gradually attenuates all frequencies 20 kc. above the test signal frequency. Thus, spurious responses, such as noise and hum, all of which have a frequency lower than the test signal frequency, are eliminated from the meter indications. The indications on the indicating meter 36 now are directly due to the passage of the A.-C. signal current by the tube under test, and nothing else.

Means are provided to calibrate the meter 36 to read in absolute units of micromhos. To this end, there is provided a voltage divider 37 comprising resistors 38 and 40, connected in series with each other and across the output of the oscillator 22. The junction between the resistors 38 and 40 is connected to the Ballantine type meter 28 through another position of the switch 32. The values of the resistors 38 and 40 of the voltage divider 37 are selected so that the ratio of the current flowing through them to the voltage impressed across them equals the value of conductance desired for full scale indication on the meter 36. For example, if the current through the voltage divider 37 increases .005 amperes for a 1 volt increase across the voltage divider, the conductance through the voltage divider is 5,000 micromhos. Therefore, since the conductance through the resistor 38 can be chosen to be 5,000 micromhos, the excitation of the oscillator 22 can be adjusted by means of the variable resistor 26 until the meter 36 reads full scale. This full scale reading is then made to indicate 5,000 micromhos. The tube tester is now calibrated and is ready to test the conductance of the grid-anode path of the tube 10, as the mutual conductance of the tube.

It will be noted that the voltage divider 37 is connected in parallel with the grid-anode path of the tube 10, the anode resistor 14, and the capacitor 20. The value of resistance of the resistor 40 is substantially the same value as that of the resistor 14. The impedance across the capacitors 20, 21 and 23 is substantially zero at the relatively high frequency of A.-C. produced by the test signal from the oscillator 22. Therefore, it will be understood that if the conductance of the grid-anode path of the tube 10 were the same as that for the resistor 38, the meter 36 would read 5,000 micromhos when the switch 32 is connected to the anode of the tube 10. In the usual case, the conductance of the gride-anode path of the tube 10 is different from the conductance through the resistor 38 and, therefore, the reading obtained on the calibrated meter 36 will indicate directly, in micromhos, the transconductance of the tube 10.

The operation of the tube tester, in accordance with the present invention, will now be described. Let it be assumed that it is desired to test the tube 10 in a manner whereby one wishes to determine its transconductance under a manufacturer's suggested operating conditions so that its actual transconductance may be compared to the transconductance value given by the tube manufacturer in standard tube manuals. The electrodes of the tube 10 are provided with desired operating potentials from the power supply 12, which may be a regulated power supply. With the tube 10 now in a state of conduction, the high frequency test signals from the oscillator 22 are applied to the control grid of the tube 10. The test signals are also applied across the voltage divider 37. Since the values of the resistances 38 and 40 have been chosen so that the conductance through the resistor 38 will be 5,000 micromhos, the excitation of the oscillator 22 is adjusted, by means of the variable resistor 26, to provide an output of an amplitude whereby the meter 36 will read full scale deflection, when the switch 32 is connected to the voltage divider 37. Thus, the Ballantine meter 28 is calibrated for use in testing the transconductance of the grid-anode path of the tube 10. The switch 32 is now connected to the anode of the tube 10. The reading on the meter 36 now indicates the aboslute value, in micromhos, of the transconductance of the grid-anode path of the tube 10. This is also the mutual conductance of the tube 10.

While the tubes tester of the present invention had been described in terms of the transconductance of the grid-anode path, of a tube it is to be understood that the transconductance between any two other electrodes in a multi electrode tube may also be determined by the apparatus and method described. Also, while the current through the resistor 38 and through the grid-anode path of the tube 10 that is measured by the Ballantine type meter 28, is a relatively high frequency A.-C. current, of say 80 kc., the reactive components of the voltage divider 37 and of the parallel circuit comprising the grid-anode path of the tube 10, the resistor 14 and the capacitor 20 are substantially negligible and only the real components of conductance, as in any D.-C. circuits, are considered.

Thus, there is shown and described an improved tube tester of relatively simple design and construction adapted to test a vacuum tube, having at least a cathode, a grid and an anode, for mutual conductance directly in units of micromhos. Operating D.-C. voltages are applied to the elements of the tube under test. A Ballantine type meter is calibrated to read directly in micromhos by means of a calibrating circuit wherein an oscillator causes an A.-C. current to flow through a resistor of known conductance. In essence, the mutual conductance, or transconductance, of the tube under test is measured by effectively substituting the grid-anode path of the tube in place of the aforementioned resistor of known conductance, whereby a direct comparison of the grid-anode conductance is observed on the meter in units of micromhos.

What is claimed is:

1. Apparatus for indicating the mutual conductance of a tube having a plurality of electrodes under operating conditions, said apparatus comprising means to apply operating voltages with respect to a voltage reference point in said apparatus to said electrodes, a source of continuous wave high frequency test signals, means to couple said signals to a selected one of said electrodes only, means to by-pass said signals to said voltage reference point, indicating means, a multi-position switch, means including said switch in one position thereof to calibrate said indicating means to read directly in units of conductance, and means including said switch in another position thereof to couple serially said selected one of said electrodes and another selected electrode of said electrodes to said indicating means whereby to measure the conductance of the path between said selected electrodes.

2. Apparatus for indicating the mutual conductance of a tube having a plurality of electrodes under operating conditions, said apparatus comprising means to apply operating voltages with respect to a voltage reference point in said apparatus to said electrodes, a source of continuous wave high frequency test signals, means to couple said signals to a selected one of said electrodes only, means to by-pass said signals to said voltage reference point, conductance indicating means, a multi-position switch, means including said switch in one position thereof to calibrate said conductance indicating means to read directly in units of conductance, and means including said switch in another position thereof to couple serially said selected one of said electrodes and another selected electrode of said electrodes to said indicating means whereby to measure the conductance of the path between said selected electrodes.

3. Apparatus for indicating the mutual conductance of a tube having a plurality of electrodes under operating conditions, said apparatus comprising means to apply operating potentials with respect to a point of reference potential in said apparatus to said electrodes, a source of continuous wave high frequency test signals, means to couple said signals to one of said electrodes only, means to by-pass said signals to said point of reference potential, conductance indicating means, means to calibrate said conductance indicating means to read directly in units of conductance, means to couple serially the path between said one of said electrodes and another of said electrodes to said conductance indicating means whereby to measure the conductance of said path, said calibrating means comprising a voltage divider of known conductance, means to apply said signals across said voltage divider, means to couple a portion of said voltage divider in series with said indicating means and in parallel with the remainder thereof, and means to control the amplitude of said signals.

4. Apparatus for indicating the mutual conductance of a tube having a plurality of eletcrodes under operating conditions, said apparatus comprising means to apply operating potentials with respect to a point of reference potential in said apparatus to said electrodes, a source of continuous wave high frequency test signals, means to couple said signals to one of said electrodes only, means to by-pass said signals to said point of reference potential, conductance indicating means, a multi-position switch, means including said switch in one position thereof to calibrate said conductance indicating means to read directly in units of conductance, means including said switch in another position thereof to couple serially the path between said one of said electrodes and another of said electrodes to said conductance indicating means whereby to measure the conductance of said path, and said potentials having a ripple frequency in the order of about one thousandth of said high frequency test signals.

5. A tube tester for measuring the mutual conductance of a tube having at least three electrodes, a resistor connected to one of said electrodes, means including said resistor to apply operating potentials to said electrodes of said tube to cause conduction therethrough, capacitive means to by-pass said operating potentials, a voltage divider, means to apply a relatively high frequency continuous wave signal to another of said electrodes only and across said voltage divider, a multi-position switch, means including said switch in one position thereof connected in series with a portion on said voltage divider and in parallel with the remainder thereof to indicate the actual conductance of said portion, said portion being of a known conductance, the impedance of said remainder of said voltage divider and of said resistor being substantially the same, and means including said switch in another position thereof to connect said indicating means in series with the path between said one electrode and said another electrode of said tube whereby to compare the conductance of said path with the known conductance of said portion.

6. A tube tester for measuring the mutual conductance of a tube having at least three electrodes, a resistor connected to one of said electrodes, means including said resistor to apply operating potentials to said electrodes of said tube to cause conduction therethrough, capacitive means to by-pass said operating potentials, a voltage divider, means to apply a relatively high frequency continuous wave signal to another of said electrodes only and across said voltage divider, a multi-position switch, means including said switch in one position thereof connected in series with a portion of said voltage divider and in parallel with the remainder thereof to indicate the actual conductance of said portion, said portion being of a known conductance, the impedance of said remainder of said voltage divider and of said resistor being substantially the same, means including said switch in another position thereof to connect said indicating means in series with the path between said one electrode and said another electrode of said tube whereby to compare the conductance of said path with the known conductance of said portion, and said potentials having a ripple frequency in the order of about one thousandth of the frequency of said signal.

7. A tube tester for measuring the mutual conductance of a tube having at least an anode, a grid and a cathode, said tester comprising means including a resistor connected to said anode to apply a source of operating potentials to said tube to cause conduction therethrough, a capacitor connected across said source, a voltage divider, means to apply a relatively high frequency continuous wave signal to said grid only and across said voltage divider, a multi-position switch, means including said switch in one position thereof connected in series with a portion of said voltage divider and in parallel with the remainder thereof to indicate the conductance of said portion, said portion being of a known conductance, the impedance of said resistor and of said remainder of said voltage divider being substantially the same, and means including said switch in another position thereof to connect said indicating means in series with the grid-anode path of said tube and in parallel with said resistor whereby to compare the conductance of said grid-anode path with the known conductance of said portion.

8. A tube tester for measuring the mutual conductance of a tube having at least an anode, a grid and a cathode, said tester comprising means including a resistor connected to said anode to apply a source of operating potentials to said tube to cause conduction therethrough, a capacitor connected across said source, a voltage divider, means to apply a relatively high frequency continuous wave signal to said grid only and across said voltage divider, a multi-position switch, means including said switch in one position thereof connected in series with a portion of said voltage divider and in parallel with the remainder thereof to indicate the conductance of said portion, said portion being of a known conductance, the impedance of said resistor and of said remainder of said voltage divider being substantially the same, means including said switch in another position thereof to connect said indicating means in series with the grid-anode path of said tube and in parallel with said resistor whereby to compare the conductance of said grid-anode path with the known conductance of said portion, and said indicating means comprising a meter calibrated in units of conductance.

9. In a tube tester of the type adapted to measure conductance of a path between two electrodes of a tube in a state of conduction as the mutual conductance thereof, two parallel circuits, one of said circuits comprising a voltage divider having first and second resistors of known conductance connected in series with each other, the other of said circuits comprising said path and a third resistor, the resistance of said second and third resistors being substantially the same, a source of continuous wave high frequency test signals, means to apply said signals across said two circuits simultaneously and in the same polarity, said signals being applied to one of said two electrodes only, conductance indicating means, a multi-position switch, means including said multi-position switch in one position thereof to connect said first resistor in series with said conductance indicating means, means to control the amplitude of said signals so that said indicating means indicates the actual conductance of said first resistor, and means including said switch in a second position thereof to connect said indicating means in series with said path.

10. A tester for measuring the mutual conductance of an electron discharge device having at least three electrodes, said testor comprising means including a resistor connected to one of said electrodes to apply a source of operating potentials to said device to cause conduction therethrough, means to capacitively bypass said potentials, a voltage divider, means to apply a relatively high frequency continuous wave signal to another of said electrodes only and across said voltage divider, a multi-position switch, means including said switch in one position thereof connected in series with a portion of said voltage divider and in parallel with the remainder thereof to indicate the conductance of said portion of said voltage divider, said portion being of a known conductance, the impedance of said resistor and of said remainder being substantially the same, and means including said switch in another position thereof to connect said indicating means in series with the path between said one electrode and said another electrode of said device and in parallel with said resistor whereby to compare the conductance of said path with the known conductance of said portion.

References Cited in the file of this patent

UNITED STATES PATENTS

| | | |
|---|---|---|
| 2,443,794 | MacNichol | June 22, 1948 |
| 2,456,833 | Morelock | Dec. 21, 1948 |
| 2,463,004 | Sunstein | Mar. 1, 1949 |
| 2,632,358 | Ehat | Mar. 24, 1953 |